Figure 1:
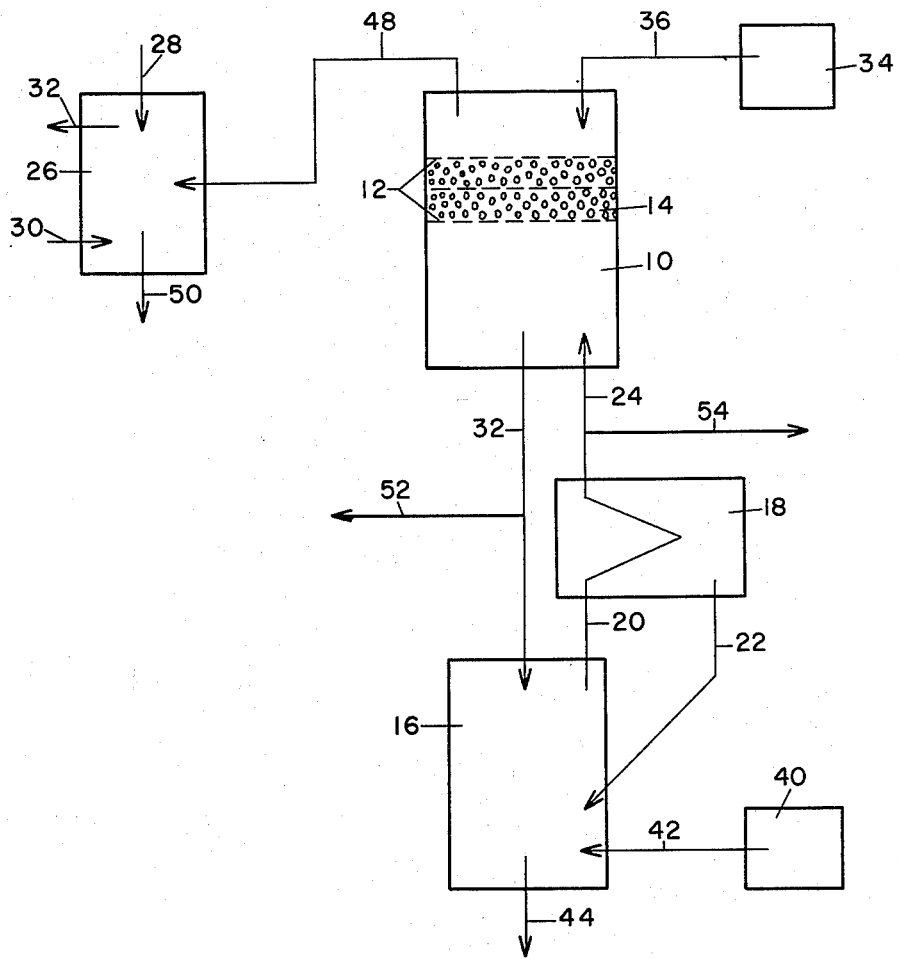

Feb. 2, 1960 T. I. TAYLOR ET AL 2,923,601
METHOD OF ISOTOPE CONCENTRATION
Filed Nov. 22, 1955 2 Sheets-Sheet 1

INVENTOR.
THOMAS IVAN TAYLOR
BY WILLIAM SPINDEL

Feb. 2, 1960  T. I. TAYLOR ET AL  2,923,601
METHOD OF ISOTOPE CONCENTRATION
Filed Nov. 22, 1955  2 Sheets-Sheet 2

INVENTOR.
THOMAS IVAN TAYLOR
BY WILLIAM SPINDEL

United States Patent Office 2,923,601
Patented Feb. 2, 1960

2,923,601

METHOD OF ISOTOPE CONCENTRATION

Thomas Ivan Taylor, Leonia, N.J., and William Spindel, New York, N.Y., assignors to the United States of America as represented by the United States Atomic Energy Commission Application November 22, 1955, Serial No. 548,557

18 Claims. (Cl. 23—160)

This invention relates to isotope concentration and more particularly it relates to an improved method for the concentration of nitrogen isotopes in a liquid or a gas by utilizing an istotope exchange reaction between substances in which said nitrogen isotopes are present.

It is an object of the present invention to provide an improved method of concentrating nitrogen isotopes by utilizing an isotope exchange reaction between nitric oxide and a liquid containing as its only active ingredient at least one compound selected from the group consisting of oxyacids and liquid oxides of nitrogen wherein the atomic ratio of oxygen to nitrogen is greater than unity.

It is a further object of the present invention to provide an improved method of increasing the concentration of nitrogen-15 in a manner that is more efficient than the methods previously used and that is capable of giving higher separation factors than previously obtainable.

Another object of the invention is to provide a method wherein the gas phase reactants containing the desired nitrogen isotope are continuously generated from the reduction products of the liquid-phase reactants.

With these and other objects in mind the present invention broadly consists in producing a liquid or gas concentrated in a desired isotope of nitrogen by a method characterized by the steps of bringing nitric oxide into intimate contact with a liquid containing as its only active ingredient at least one compound selected from the group consisting of the oxyacids and liquid oxides of nitrogen, causing an exchange of nitrogen isotopes to take place between the liquid and the nitric oxide and withdrawing a product enriched with respect to the desired nitrogen isotope.

In a somewhat narrower aspect, the present invention comprises a method of concentrating nitrogen-15 in a liquid characterized by the steps of bringing into intimate contact gaseous nitric oxide and at least one liquid selected from the group consisting of the aqueous oxyacids and liquid oxides of nitrogen in which the atomic ratio of oxygen to nitrogen is greater than unity to cause an enrichment of the liquid and a depletion of the gas in nitrogen-15, reacting the liquid after such contact with sulfur dioxide to produce a gas containing nitric oxide, continuously passing said gas in countercurrent contact with said liquid to cause further enrichment of said liquid, and withdrawing enirched liquid as product.

As conducive to a clearer understanding of the present invention, it may be pointed out that when nitric oxide and nitric acid, for example, are brought into contact with each other an isotopic exchange occurs in accordance with the following equation:

$$N^{15}O(gas) + HN^{14}O_3(liquid) \rightleftharpoons N^{14}O(gas)$$
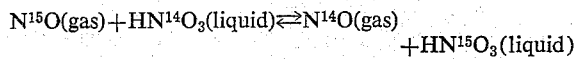

The equilibrium distribution of nitrogen-15 between the nitric oxide and nitric acid may be represented by the following equation:

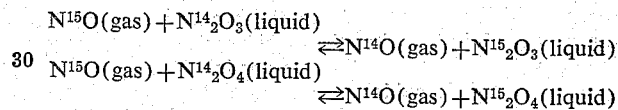

wherein $K$=a constant at any given temperature, $HN^{15}O_3/HN^{14}O_3$=the molal ratio of the nitrogen-15 containing species to the nitrogen-14 containing species in the liquid phase and $N^{15}O/N^{14}O$=the molal ratio of the nitrogen-15 containing species to the nitrogen-14 containing species in the gaseous phase.

In this equation K is the distribution ratio of the heavy and light isotopes of nitrogen, that is, the separation factor for the concentration of nitrogen-15 in the liquid phase. The equilibrium distribution of nitrogen-15 between the liquid phase and gaseous phase is a constant at any given temperature. If, for example, the value of the constant K is 1.06, it means that the equilibrium distribution is such that the concentration of nitrogen-15 in the nitric acid is about six percent greater than in the gas phase, that is, nitrogen-15 will tend to be transferred from the gaseous nitric oxide to the nitric acid.

The above explanation is similarly applicable to the other liquids embraced by the present invention. For example, isotopic exchange occurs in accordance with the following reactions:

$N^{15}O(gas) + N^{14}{}_2O_3(liquid)$
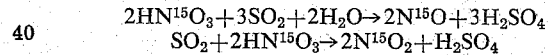

$N^{15}O(gas) + N^{14}{}_2O_4(liquid)$
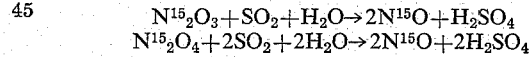

An important aspect of the present invention is the conversion of the enriched liquid produced by the exchange to a gas enriched in nitrogen-15 by reacting the liquid with gaseous sulfur dioxide. When the liquid used is nitric acid, this reaction is represented by the following equations:

$$2HN^{15}O_3 + 3SO_2 + 2H_2O \rightarrow 2N^{15}O + 3H_2SO_4$$
$$SO_2 + 2HN^{15}O_3 \rightarrow 2N^{15}O_2 + H_2SO_4$$

In the case of the reaction of sulfur dioxide with dinitrogen trioxide and dinitrogen tetroxide the reactions are as follows:

$$N^{15}{}_2O_3 + SO_2 + H_2O \rightarrow 2N^{15}O + H_2SO_4$$
$$N^{15}{}_2O_4 + 2SO_2 + 2H_2O \rightarrow 2N^{15}O + 2H_2SO_4$$

Figure 2:
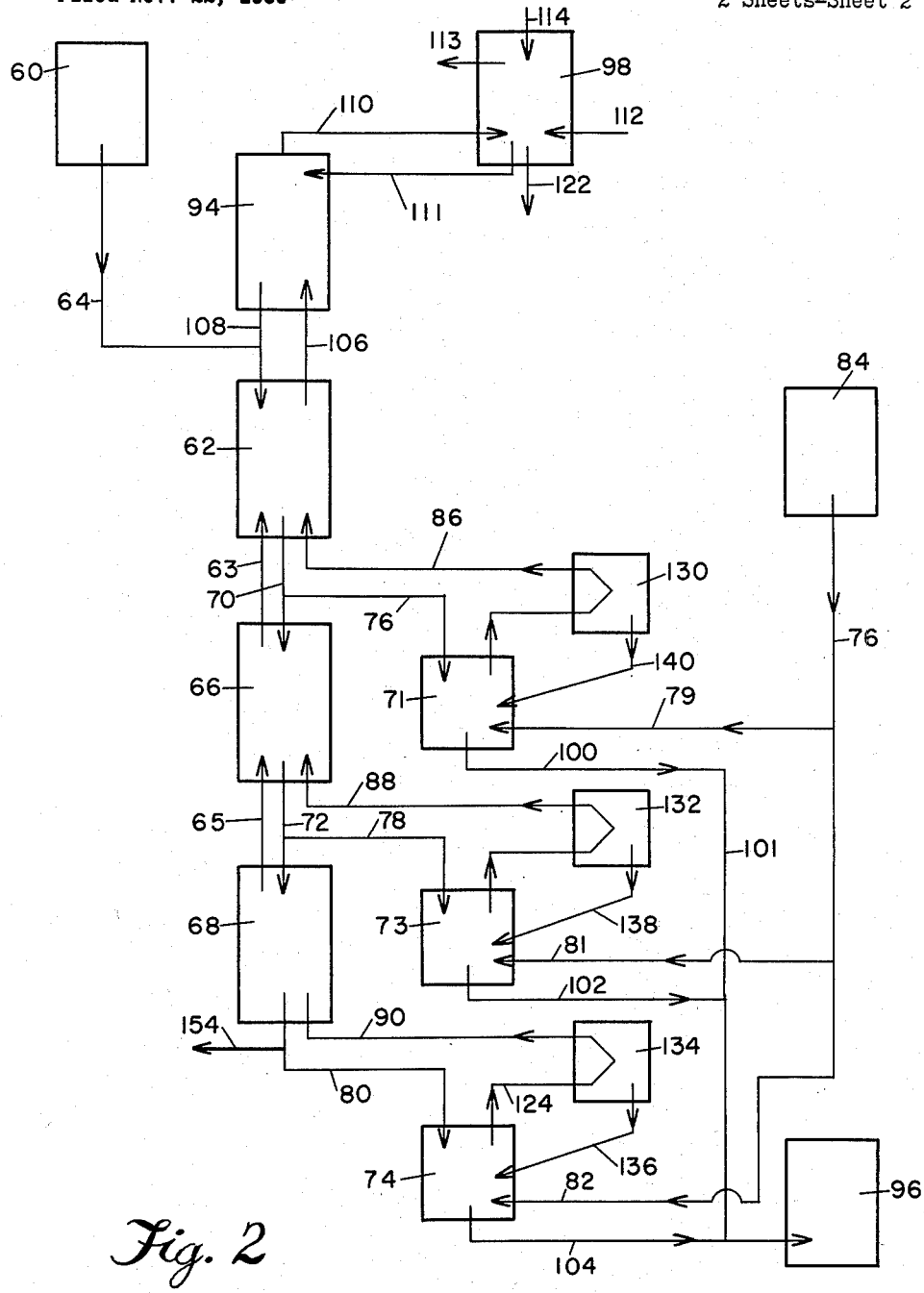

The advantages of the present invention will be more readily apparent by reference to the following detailed description when taken in connection with the accompanying drawings in which:

Figure 1 is a flow diagram showing one embodiment of apparatus suitable for use in carrying out the process of the invention in accordance with which countercurrent flow of reactants is employed and Figure 2 is a flow diagram of a multi-stage separation process in accordance with the invention, countercurrent flow being likewise employed.

In general, conventional elements such as valves, pumps, etc. are not shown in the drawings since their use and disposition will be obvious to those skilled in the art. Referring in detail to Figure 1, reference numeral 10 generally designates a multi-plate countercurrent exchange tower of the type commonly used in processing two substances which are in distinct, separable phases by passing the substances in countercurrent contact with each other through the tower. As examples of such substances exemplifying this invention, there may be mentioned a water solution of nitric acid and gaseous nitric oxide, additional examples being given hereinafter. The tower may be constructed with a plurality of spaced perforated plates 12 having a packing 14 positioned therebetween, as illustrated, or it may be constructed as a conventional bubble plate-tower or the like, or in any other manner suitable for bringing about intimate contact between the liquid and gaseous substances. In the tower 10, the liquid phase flows downward in countercurrent contact with the gas phase flowing upward to enrich the liquid phase in the desired isotope.

The liquid embraced by the present invention is fed from a storage tank 34 into exchange tower 10 through conduit 36. The liquid passes downward through tower 10; then from tower 10 through conduit 32 into a reflux chamber 16. The gas phase is introduced to tower 10 through conduit 24 and passes upward thorugh the tower whence it flows through conduit 48 to a reactor 26, presently to be described.

In reflux chamber 16, the liquid phase is reacted with gaseous sulfur dioxide introduced from a storage tank 40 through a conduit 42. The reaction between aqueous nitric acid, for example, and sulfur dioxide generates gaseous oxides of nitrogen and aqueous sulfuric acid. The sulfuric acid is removed from the bottom of the reflux chamber 16 through conduit 44. The gaseous oxides of nitrogen pass upward through the refluxer 16 and through conduit 20 into a condenser 18. The condenser 18 is maintained at a temperature sufficient to condense the less volatile components of the gas. For example, an equimolecular mixture of nitric oxide and nitrogen dioxide will condense at about 3° C. to form liquid dinitrogen trioxide and since this liquid is unstable at temperatures above 3° C. it readily evolves nitric oxide which flows upwardly to the exchange tower 10 through conduit 24, after the liquid dinitrogen trioxide is returned to refluxer 16 through conduit 22.

The gas (nitric oxide) passes upwardly to exchange tower 10 through conduit 24 where it comes into intimate countercurrent contact with the downwardly flowing liquid to cause a continuous exchange of nitrogen isotopes to take place between the liquid and the gas. The gas, depleted with respect to its nitrogen-15 content, passes to reactor 26, through conduit 48 from the tower 10. In reactor 26, the gas reacts with water entering through conduit 28 and air entering the reactor through conduit 30 to regenerate aqueous nitric acid. The nitric acid can then be passed from reactor 26 through conduit 50 to a suitable storage tank, not shown. The reactor may be packed with raschig rings, for example, to assure adequate contact between the reactants.

Liquid enriched in its nitrogen-15 isotope may be withdrawn through side conduit 52. On the other hand, it may be desired to obtain the nitrogen-15 enriched material as a gas. In the latter case, gas enriched in nitrogen-15 may be removed through side conduit 54 connected to conduit 24.

It should be noted that when using countercurrent flow of the exchange reactants in conjunction with the sulfur dioxide reaction providing a reflux stream, it is possible to secure a desired concentration of nitrogen-15 in the form of either gas or liquid (gaseous nitric oxide or liquid nitric acid, for example).

The apparatus shown in Figure 1 comprises one unit for concentrating and separating a material enriched in its nitrogen-15 isotope. The concentration of the desired isotope in the liquid phase and the separation of the substance from the other phase may be carried out in a plurality of similar units, each comprising a tower for countercurrent contact of liquid and gaseous phases, a reflux chamber for generating the gaseous reactants and a condenser to maintain the proper concentration of gases in the gaseous phase. The liquid enriched in its nitrogen-15 isotope leaving the tower 10 of Figure 1 through conduit 52, may be passed as feed to a next succeeding unit for further concentration therein of the desired isotope.

The process of concentrating nitrogen-15 as a gas or a liquid material by employing nitric acid and nitric oxide as the exchange reactants may be carried out in the apparatus of Figure 1 in the following manner:

Nitric acid having a desired concentration, ten molar for example, is continuously fed into tower 10 through conduit 36 from storage tank 34. The nitric acid is passed through tower 10, conduit 32 and thence to refluxer 16. Gaseous sulfur dioxide is fed into refluxer 16 from storage tank 40 through conduit 42. The reaction between gaseous sulfur dioxide and the nitric acid solution produces sulfuric acid, nitric oxide, and other normally gaseous oxides of nitrogen. The gaseous oxides of nitrogen pass upwardly to condenser 18 through conduit 20. The condenser 18 is maintained at a temperature (about 3° C.) sufficient to form unstable liquid dinitrogen trioxide from equimolar portions of gaseous nitric oxide and nitrogen dioxide. This unstable liquid is passed to the reflux chamber where it dissociates into nitric oxide and nitrogen dioxide, the nitrogen dioxide reacting with additional sulfur dioxide to produce nitric oxide.

The more volatile nitric oxide is continuously passed, as reflux, through conduit 24 to exchange tower 10 where it comes into intimate countercurrent contact with the downwardly flowing nitric acid. In tower 10 continuous exchange of nitrogen isotopes occurs between the countercurrently flowing liquid and gaseous phases such that the nitric acid is continuously enriched with respect to nitrogen-15 and the nitric oxide is continuously depleted with respect to nitrogen-15.

The nitric oxide, depleted in nitrogen-15, then passes from the exchange tower 10 to reactor 26 through conduit 48. The nitric oxide is reacted with water introduced in the reactor 26 through conduit 28 and with air introduced into the reactor through conduit 30 to produce nitric acid, depleted in its nitrogen-15 isotope. The nitric acid thus produced may be removed from reactor 36 through conduit 50.

For its ease in handling, the liquid product is preferred, and, nitric acid enriched in its nitrogen-15 isotope is withdrawn at the bottom of the exchange tower through conduit 52. However, if desired, nitric oxide enriched in nitrogen-15 may be removed from the system through conduit 54.

When aqueous nitric acid is used as the liquid phase, the extent to which an exchange of nitrogen-15 takes place in the exchange tower between liquid and gas phases depends on several variables, among which are the concentration of nitric acid, the gas pressure and the flow rate of the nitric acid. The concentration of any nitrogen dioxide that is present also has an important effect which will be adverted to later.

The effect of concentration of the nitric acid on the overall separation is shown in Table I.

*Table I*

| Concentration of Nitric Acid in Moles per Liter | Overall Separation |
| --- | --- |
| 12 | 2 |
| 10 | 2.5 |
| 8 | 2.3 |
| 6 | 2.0 |
| 2 | 1.15 |

The results in Table I were obtained in a column having a diameter of 1.0 centimeter and a length of 1.5 meters packed with 3/32 inch glass helices and operating at room temperature with aqueous nitric acid flowing downward through the column at a rate of 1.5 cubic centimeters per square centimeter per minute. The data of Table I demonstrate that maximum separation is achieved using a nitric acid concentration between 6 and 12 moles per liter when the exchange is performed at atmospheric pressure and room temperature. The reason for this requires consideration of some other factors which affect the isotopic exchange reaction.

We have found that the presence of certain reduction products of nitric acid, other than nitric oxide, in the exchange zone increases the rate of isotopic exchange between the countercurrently flowing liquid and gas, that is, they catalyze the reaction. When nitric oxide is brought in contact with nitric acid as in the exchange column, dinitrogen trioxide, nitrogen dioxide, dinitrogen tetroxide and nitrous acid are produced. The concentration of all of these reduction products is dependent on the concentration of the nitric acid. For example, as the concentration of the aqueous nitric acid is increased, the contacting or equilibration thereof with nitric oxide produces increasing amounts of nitrogen dioxide and decreasing amounts of nitric oxide. At the same time, while the presence of reduction products of nitric acid increases the rate of isotopic exchange, the presence of excess amounts of these reduction products in the exchange zone decreases the equilibrium constant for the isotopic exchange between the countercurrently flowing liquid phase and gas phase. Accordingly, the reduction of nitric acid in the reflux with sulfur dioxide should be controlled so that the composition of the gases produced is about the same as that in equilibrium with the aqueous nitric acid solution in the exchange column.

With respect to the exchange with nitric acid the concentration of nitrogen dioxide is especially influential. It has a catalytic effect that is optimum when its partial pressure in the gaseous phase is maintained at about that in equilibrium with the nitric acid in the exchange column. This partial pressure may be conveniently controlled by adding water to the reflux chamber (5 to 10% of the nitric acid flow). Alternatively, the partial pressure of nitrogen dioxide in the system may be controlled by condensing it in condenser 18 of Figure 1. By maintaining the condenser at about 3° C. the nitrogen dioxide combines equimolecularly with nitric oxide to form liquid dinitrogen trioxide which is cycled back to the reflux chamber 16. Still another method is to control the rate of addition of sulfur dioxide to the reflux chamber. The concentration of nitrogen dioxide may be monitored by using a photometer cell or some other detecting means near the top of reflux chamber 16 to provide a signal whenever the color produced by the nitrogen dioxide becomes too intense. The signal may be used to control the addition of sulfur dioxide or of water.

We have found that for a given flow of nitric acid, the separation is increased by an increase in pressure. For example, at one atmosphere and a flow rate of nitric acid of 2.9 cubic centimeters per square centimeter per minute an overall separation of 2.2 was obtained. However, at the same concentration and flow rate of nitric acid and operating at 2 atmospheres an overall separation of 2.65 was obtained.

The overall separation is a measure of the total desired separation and is defined by the following relation: $S=K^n$, where $S$=overall separation desired, $K$=single stage separation factor, a measure of the increase of a desired isotope in a single stage and $n$=number of stages needed to achieve the desired overall separation.

The apparatus of Figure 1 may, with minor modifications that will occur to those skilled in the art, be adapted for concentrating nitrogen-15 in the other liquids of the present invention. For example, when dinitrogen trioxide is the liquid used, the principal modification is to operate the exchange column below the boiling point of the dinitrogen trioxide (3 to 5° C.). Using the dinitrogen trioxide-nitric oxide system we have obtained an overall separation of 2.1 at 3 to 5° C. in a column 2.0 meters long, 1.0 centimeter in inside diameter, packed with 3/32 inch glass helices. In the case of dinitrogen tetroxide the exchange column is operated below about 21° C.

Figure 2 of the drawings illustrates an apparatus that may be advantageously employed for large-scale isotopic concentration between gaseous nitric oxide and aqueous nitric acid flowing in a series of exchange columns, the nitrogen-15 being concentrated in the aqueous phase.

In general, conventional elements such as valves, pumps, etc. are not shown since their use and disposition will be obvious to those skilled in the art. Referring to the drawing, reference numerals 62, 66 and 68, respectively, designate exchange columns of stainless steel, for example, which may be packed with Intalox saddles, or may be of the bubble cap type. The dimensions of the contact towers required to increase the concentration of the nitrogen-15 isotope in a particular substance can be obtained by methods employed in connection with conventional distillation processes. These dimensions depend on such factors as the rates of flow of the substances brought into contact with each other, the rate of the exchange reactions, the type of tower construction, etc. Those skilled in the art can readily determine such dimensions from the general information given herein.

Reference numerals 71, 73 and 74, respectively, designate reflux chambers for generating nitric oxide and sulfuric acid by reacting the nitric acid produced in columns 62, 66 and 68, respectively, with sulfur dioxide. The reflux chambers may be of glass-lined steel construction packed with ceramic beads or saddles. Reference numerals 130, 132 and 134 designate condensers for condensing nitrogen dioxide and other gases produced from the reaction between nitric acid and gaseous sulfur dioxide and these condensers are connected, respectively, between reflux chambers 71, 73 and 74 and exchange columns 62, 66 and 68, in the manner described with respect to Figure 1. Reference numeral 96 designates a glass-lined steel tank for storing the sulfuric acid produced in the refluxers; reference numeral 94 designates a stainless steel stripping column for stripping the nitrogen-15 isotope from the nitric oxide entering column 94 through conduit 106 and leaving through conduit 110. Finally, reference numeral 98 designates a reactor of stainless steel wherein the stripped nitric oxide is reacted with air and water to yield nitric acid depleted in its nitrogen-15 isotope. A part of this depleted nitric acid is returned to column 94 as the stripping medium through conduit 111 and the remainder is drawn off through conduit 122 for commercial use.

Illustrative of the present method, the flow of aqueous nitric acid and gaseous nitric oxide in the system is as follows:

Nitric acid having the natural abundance of the nitrogen isotopes is continuously flowed as feed stock into the first exchange column 62 from a storage tank 60 through conduit 64. After the nitric acid has flowed downwardly through the column in contact with upwardly flowing nitric oxide, this acid is withdrawn through conduit 70 and a portion is passed through conduit 76 to the first reflux chamber 71. Here the acid reacts with gaseous sulfur dioxide entering the chamber 71 from a storage tank 84 through a manifold 76 and conduit 79. The remainder of the nitric acid continues through conduit 70 as feed to the top of the next exchange column 66.

The reaction between the gaseous sulfur dioxide and nitric acid produces sulfuric acid and a gas, principally nitric oxide, but containing also some nitrogen dioxide. Sulfuric acid is removed from the first reflux chamber 71 to a central storage tank through conduit 100 and a manifold 101. The gaseous mixture of nitric oxide and nitrogen dioxide is passed to condenser 130 where the gas is cooled to remove heat generated in the sulfur dioxide-nitric acid reaction and also, if necessary, to adjust the partial pressure of nitrogen dioxide in the gas. Any material condensed in condenser 130 is returned to refluxer 71 through conduit 140. The cooled nitric oxide is passed through exchange column 62 in countercurrent contact with the downwardly flowing nitric acid.

Nitric acid enriched in nitrogen-15 is removed from the exchange column 62 through conduit 70, a portion flowing into reflux chamber 71 and the remainder continuing to the top of the second exchange column 66 to provide liquid feed.

After the gaseous nitric oxide has left the exchange column 62, it is passed to a stripping column 94 through conduit 106 to remove more of its nitrogen-15 isotope by stripping it with nitric acid in reactor 98. The nitric acid from column 94 is returned to exchange column 62 through conduit 108. The stripped nitric oxide is then passed through conduit 110 to a reactor 98 where it reacts with air entering through conduit 112 and water entering through conduit 114 to produce nitric acid. A portion of the nitric acid is removed from reactor 98 through conduit 122 and the remainder is passed to stripping column 94 to strip the nitric oxide of its nitrogen-15 content. Waste gases are passed from the reactor through conduit 113.

In like manner, exchange column 66 operates to cause further enrichment of the liquid phase in the nitrogen-15 isotope. The enriched nitric acid from exchange column 62 flows downward through column 66 and is removed through conduit 72. A portion of this nitric acid flows through conduit 78 into reflux chamber 73, where it reacts with gaseous sulfur dioxide entering the reflux chamber from conduit 81 and the sulfur dioxide manifold 76. The remainder of the enriched nitric acid produced in column 66 continues through conduit 72 to the top of the next exchange column 68 as feed.

Sulfuric acid and an enriched gas containing nitric oxide and nitrogen dioxide are produced in reflux chamber 73. The sulfuric acid is removed from chamber 73 to storage tank 96 through conduit 102 and manifold 101. The gas produced is passed to condenser 132 where the gas is cooled and any necessary correction of the partial pressure of the nitrogen dioxide in the gaseous phase is made. Thence the gas flows to exchange column 66 through conduit 88 and passes upwardly in countercurrent contact with nitric acid flowing down. (Condensate from condenser 132 is recycled to refluxer 73 through conduit 138). After flowing through column 66, the nitric oxide is flowed to exchange column 62 through conduit 63. Nitric acid enriched in its nitrogen-15 isotope is removed from the exchange column 66 through conduit 72, a portion flowing through conduit 78 to reflux chamber 73 and the remainder passing as feed to exchange column 68.

Exchange column 68 and its companion reflux chamber 74 are operated in a similar manner to exchange columns 62 and 68 and reflux chambers 71 and 73. In this case, enriched nitric acid from exchange column 66 provides the liquid feed for exchange column 68. The enriched nitric acid is passed through exchange column 68 and a portion is removed to refluxer 74 through conduit 80. Gaseous sulfur dioxide is fed into the refluxer 74 where it reacts with the nitric acid to produce sulfuric acid, and a gaseous nitric oxide enriched in nitrogen-15. The gas passes to condenser 134 through conduit 124 where it is cooled and, if necessary, a portion condensed. Any condensate is recycled to reflux chamber 74 and the gas with its concentration of nitrogen dioxide adjusted, as necessary, to about that in equilibrium with the nitric acid, is passed to exchange column 68 through conduit 90. The gas is passed upwardly in exchange column 68 in countercurrent contact with the downwardly flowing nitric acid. The product, nitric acid enriched in its nitrogen-15 isotope, is removed from the system through conduit 154.

The subject process is readily adaptable to large-scale production because of the ready availability of the reactants in quantity and because of the commercially acceptable by-products produced therefrom. For example, the sulfuric acid produced when 10 molar nitric acid is used as feed in the exchange system was appproximately 60° Baumé. The nitric acid recovered in the waste refluxer is 10 molar, and, but for normal losses, substantially all the nitric acid feed is recoverable. Also, the low cost of air and water for regenerating the nitric acid makes this part of the process economical. Thus the subject process merely "borrows" the raw materials temporarily to remove nitrogen-15 and can then pass them back into the normal commercial channels.

Since it is obvious that many other modifications and embodiments of the above-described details can be made without departing from the nature and spirit of the invention, it is to be understood that this invention is not to be limited to the above-described details except as set forth in the appended claims.

We claim:

1. A method of concentrating nitrogen-15 which comprises passing gaseous nitric oxide of at least some nitrogen-15 content through an exchange zone in intimate contact with a liquid containing as its active ingredient at least one compound selected from the group consisting of the oxyacids and oxides of nitrogen containing at least some nitrogen-14 wherein the atomic ratio of oxygen to nitrogen is greater than unity to cause said liquid to be enriched in its nitrogen-15 content, reacting the enriched liquid in a separate reducing zone with a reducing agent to produce nitric oxide enriched in nitrogen-15, and cycling at least a portion of said enriched nitric oxide to said exchange zone to withdraw a product enriched in its nitrogen-15 content.

2. A method of concentrating nitrogen-15 which comprises passing nitric oxide to an exchange zone in countercurrent contact with a liquid containing as its active ingredient at least one compound selected from the group consisting of the oxyacids and oxides of nitrogen wherein the atomic ratio of oxygen to nitrogen is greater than unity to enrich said liquid in its nitrogen-15 isotope, reacting a portion of said enriched liquid in a reducing zone with gaseous sulfur dioxide to produce said nitric oxide and withdrawing the remaining portion of said liquid as the product enriched in its nitrogen-15 content.

3. A method of concentrating nitrogen-15 which comprises bringing gaseous nitric oxide of at least some nitrogen-15 content into intimate contact with a liquid containing as its active ingredient a compound selected from the group consisting of the oxyacids and oxides of nitrogen containing at least some nitrogen-14 wherein the atomic ratio of oxygen to nitrogen is greater than unity to cause said liquid to be enriched in its nitrogen-15 isotope, said gaseous nitric oxide being produced from the reaction between said enriched liquid and sulfur dioxide and separating a product enriched in its nitrogen-15 content.

4. A method of concentrating nitrogen-15 which comprises passing a liquid to an exchange zone in intimate countercurrent contact with gaseous nitric oxide flowing into said zone from a separate reducing zone to enrich the liquid in its nitrogen-15 isotope, said liquid containing as its active ingredient at least one compound selected from the group consisting of the oxyacids and oxides of nitrogen wherein the atomic ratio of oxygen to nitrogen is greater than unity, reacting said enriched liquid in said reducing zone with a reducing agent to produce enriched gaseous nitric oxide, cycling said enriched nitric oxide to said exchange zone in intimate countercurrent contact therein with said liquid, and withdrawing a product whose nitrogen-15 content is substantially equal to that of the liquid entering said reducing zone.

5. A method of concentrating nitrogen-15 which comprises passing nitric acid to an exchange zone in intimate contact with gaseous nitric oxide of at least some nitrogen-15 content flowing into said zone from a separate reducing zone to enrich the nitric acid in its nitrogen-15 content, passing the enriched nitric acid to said reducing zone in contact therein with gaseous sulfur dioxide to produce enriched gaseous nitric oxide, cycling at least a portion of said enriched nitric oxide to said exchange zone in intimate contact therein with nitric acid and to withdraw a product enriched in its nitrogen-15 content.

6. A method of concentrating nitrogen-15 which comprises passing dinitrogen trioxide to an exchange zone in intimate contact with gaseous nitric oxide flowing into said zone from a separate reducing zone to enrich the dinitrogen trioxide in its nitrogen-15 content, passing the enriched dinitrogen trioxide to said reducing zone in contact therein with gaseous sulfur dioxide to produce enriched gaseous nitric oxide, cycling said enriched nitric oxide to said exchange zone in intimate contact therein with said dinitrogen trioxide and withdrawing a product enriched in its nitrogen-15 content.

7. A method of concentrating nitrogen-15 which comprises passing dinitrogen tetroxide into an exchange zone in intimate contact with gaseous nitric oxide flowing into said exchange zone from a separate reducing zone to enrich the dinitrogen tetroxide in its nitrogen-15 content, passing said enriched dinitrogen tetroxide to said reducing zone in contact therein with gaseous sulfur dioxide to produce enriched gaseous nitric oxide, cycling said enriched nitric oxide to said exchange zone in intimate contact therein with said dinitrogen tetroxide and withdrawing a product enriched in its nitrogen-15 content.

8. The method according to claim 5 wherein the nitric oxide depleted in its nitrogen-15 content is reacted with air and water to convert the nitric oxide to nitric acid depleted in its nitrogen-15 content.

9. The method according to claim 5 wherein gaseous nitric oxide enriched in its nitrogen-15 isotope is withdrawn as product.

10. A method of concentrating nitrogen-15 which comprises passing 6 to 12 molar nitric acid to an exchange zone in intimate contact with gaseous nitric oxide flowing into said zone from a separate reducing zone to enrich the nitric acid in its nitrogen-15 content, passing said enriched nitric acid to said reducing zone in contact therein with gaseous sulfur dioxide to produce enriched gaseous nitric oxide, cycling said enriched nitric oxide to said exchange zone in intimate contact therein with said nitric acid and withdrawing a product enriched in its nitrogen-15 content.

11. A method of concentrating nitrogen-15 which comprises passing 6 to 12 molar aqueous nitric acid to an exchange zone in intimate contact with a gaseous mixture comprising nitric oxide and nitrogen dioxide flowing into said zone from a separating reducing zone while maintaining the partial pressure of the nitrogen dioxide at about that in equilibrium with the aqueous phase to enrich the nitric acid in its nitrogen-15 isotope, passing the enriched nitric acid to said reducing zone in intimate contact therein with gaseous sulfur dioxide to produce sulfuric acid and said gaseous oxide mixture enriched in its nitrogen-15 content, cycling said enriched gaseous mixture to said exchange zone and withdrawing a portion of enriched nitric acid.

12. The method according to claim 11 wherein the partial pressure of nitrogen dioxide is maintained by cooling said gaseous mixture.

13. The method according to claim 11 wherein water is added to the reaction mixture of nitric acid and sulfur dioxide to maintain the partial pressure of nitrogen dioxide at about that in equilibrium with nitric acid.

14. The method according to claim 11 wherein gas enriched in its nitrogen-15 content is withdrawn as product.

15. The method of concentrating nitrogen-15 which comprises passing nitric acid containing at least some nitrogen-14 to an exchange zone in countercurrent contact with gaseous nitric oxide containing at least some nitrogen-15 flowing to said exchange zone from a separate reducing zone to enrich the nitric acid in its nitrogen-15 content and to deplete the nitric oxide in its nitrogen-15 content, passing the enriched nitric acid to said reducing zone in contact therein with a reducing agent to produce sulfuric acid and enriched gaseous nitric oxide, reacting the nitric oxide depleted in its nitrogen-15 content with air and water to produce nitric acid depleted in its nitrogen-15 content and passing a portion of said depleted nitric acid to said exchange zone in countercurrent contact with the nitric oxide in said exchange zone to enrich the depleted nitric acid in its nitrogen-15 content and withdrawing nitric acid enriched in its nitrogen-15 isotope.

16. A method of concentrating nitrogen-15 which comprises passing a gas containing nitric oxide through an exchange zone in continuous countercurrent contact with liquid nitric acid to enrich the nitric acid in its nitrogen-15 content, refluxing the nitric oxide passing from said exchange zone with air and water to form nitric acid, cycling at least a portion of the thus formed nitric acid through said exchange zone in continuous countercurrent contact with the nitric oxide in said zone, in a separate reducing zone refluxing the enriched nitric acid passing from said exchange zone with gaseous sulfur dioxide to produce sulfuric acid and said gas, passing the thus formed gas in countercurrent contact with the nitric acid in said exchange zone and recovering a product enriched in the desired nitrogen isotope.

17. The method according to claim 16 in which the concentration of the nitric acid in the exchange zone is 6 to 12 molar.

18. A method of concentrating nitrogen-15 which comprises passing a gas containing nitric oxide and nitrogen dioxide through an exchange zone in continuous countercurrent contact with liquid nitric acid to enrich the nitric acid in its nitrogen-15 content, refluxing the nitric oxide passing from said exchange zone with air and water to form nitric acid, cycling at least a portion of the thus formed nitric acid through said exchange zone in continuous countercurrent contact with the gas in said exchange zone, controlling the partial pressure of nitrogen dioxide in said exchange zone at about that in equilibrium with the aqueous phase, in a separate reducing zone, refluxing the enriched nitric acid passing from said exchange zone with gaseous sulfur dioxide to produce sulfuric acid and said gas, passing the thus formed gas in countercurrent contact with the nitric acid in said exchange zone and recovering a product enriched in the desired nitrogen isotope.

References Cited in the file of this patent

Kirshenbaum et al.: Journal of Chemical Physics, vol. 15, No. 7, July 1947, pages 440–446.

Mellor: "Comprehensive Treatise on Inorganic and Theoretical Chemistry," vol. 8, page 586. Longmans, Green and Co., N.Y., 1928.